US010891709B2

(12) United States Patent
Chung et al.

(10) Patent No.: US 10,891,709 B2
(45) Date of Patent: Jan. 12, 2021

(54) METHODS AND APPARATUS FOR GPU ATTRIBUTE STORAGE

(71) Applicant: QUALCOMM Incorporated, San Diego, CA (US)

(72) Inventors: Kyusik Chung, San Diego, CA (US); Li Shen, San Diego, CA (US); SeokHoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/367,165

(22) Filed: Mar. 27, 2019

(65) Prior Publication Data

US 2020/0311862 A1 Oct. 1, 2020

(51) Int. Cl.
*G09G 5/00* (2006.01)
*G06T 1/60* (2006.01)
*G06T 1/20* (2006.01)

(52) U.S. Cl.
CPC . *G06T 1/60* (2013.01); *G06T 1/20* (2013.01)

(58) Field of Classification Search
CPC ........... G06T 15/20; G06T 7/60; G06T 15/10; G06T 15/80; G06T 2200/04; G06T 1/60
See application file for complete search history.

(56) References Cited

U.S. PATENT DOCUMENTS

| 2012/0223947 | A1* | 9/2012 | Nystad | G06T 15/80 345/426 |
| 2017/0039396 | A1* | 2/2017 | Sharp | G06F 12/1458 |
| 2020/0074726 | A1* | 3/2020 | Gierach | G06T 1/20 |

* cited by examiner

*Primary Examiner* — Hau H Nguyen
(74) *Attorney, Agent, or Firm* — Cambell C. Chiang; Procopio Cory Hargreaves & Savitch LLP

(57) ABSTRACT

The present disclosure relates to methods and apparatus of operation of a GPU. The apparatus can determine a plurality of attributes including one or more vertex attributes and one or more instance attributes. The apparatus can also send the plurality of attributes to at least one processing unit. Additionally, the apparatus can store at least one of the plurality of attributes in a buffer of the at least one processing unit. In some aspects, the at least one of the plurality of attributes can include the one or more instance attributes. The apparatus can also retrieve the at least one of the plurality of attributes from the buffer when the at least one of the plurality of attributes is stored in the buffer. Also, the apparatus can store at least some of the plurality of attributes in a cache of the at least one processing unit.

27 Claims, 7 Drawing Sheets

METHODS AND APPARATUS FOR GPU ATTRIBUTE STORAGE

TECHNICAL FIELD

The present disclosure relates generally to processing systems and, more particularly, to one or more techniques for graphics processing.

BACKGROUND

Computing devices often utilize a graphics processing unit (GPU) or other type of processor to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes one or more processing stages that operate together to execute graphics processing commands and output a frame. A central processing unit (CPU) may control the operation of the GPU by issuing one or more graphics processing commands to the GPU. Modern day CPUs are typically capable of concurrently executing multiple applications, each of which may need to utilize the GPU during execution. A device that provides content for visual presentation on a display generally includes a GPU.

Caches are used to store data and make that data accessible for subsequent data requests. In some aspects, GPUs can utilize caches so that future data requests can be processed quickly. GPUs can also be configured to perform processes in a graphics processing pipeline. However, with the advent of wireless communication and the streaming of content, e.g., graphical content or any other content that is rendered using a GPU, there has developed a need for improved graphics processing.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a GPU. The apparatus can determine a plurality of attributes. In some aspects, the plurality of attributes can include one or more vertex attributes and one or more instance attributes. The apparatus can also send the plurality of attributes to at least one processing unit. In some aspects, the at least one processing unit can be in a graphics processing pipeline of the GPU. Additionally, the apparatus can store at least one of the plurality of attributes in a buffer of the at least one processing unit. In some aspects, the at least one one of the plurality of attributes can include the one or more instance attributes.

Also, the apparatus can store at least some of the plurality of attributes in a cache of the at least one processing unit. The apparatus can also determine vertex information of one or more vertices, where the plurality of attributes corresponds to the vertex information of the one or more vertices. In some aspects, when sending the plurality of attributes to the at least one processing unit, the apparatus can also retrieve the plurality of attributes from an external memory. Further, the apparatus can generate the buffer of the at least one processing unit at the at least one processing unit. The apparatus can also send at least one request from a vertex fetcher and decoder (VFD) to an L2 cache (UCHE).

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
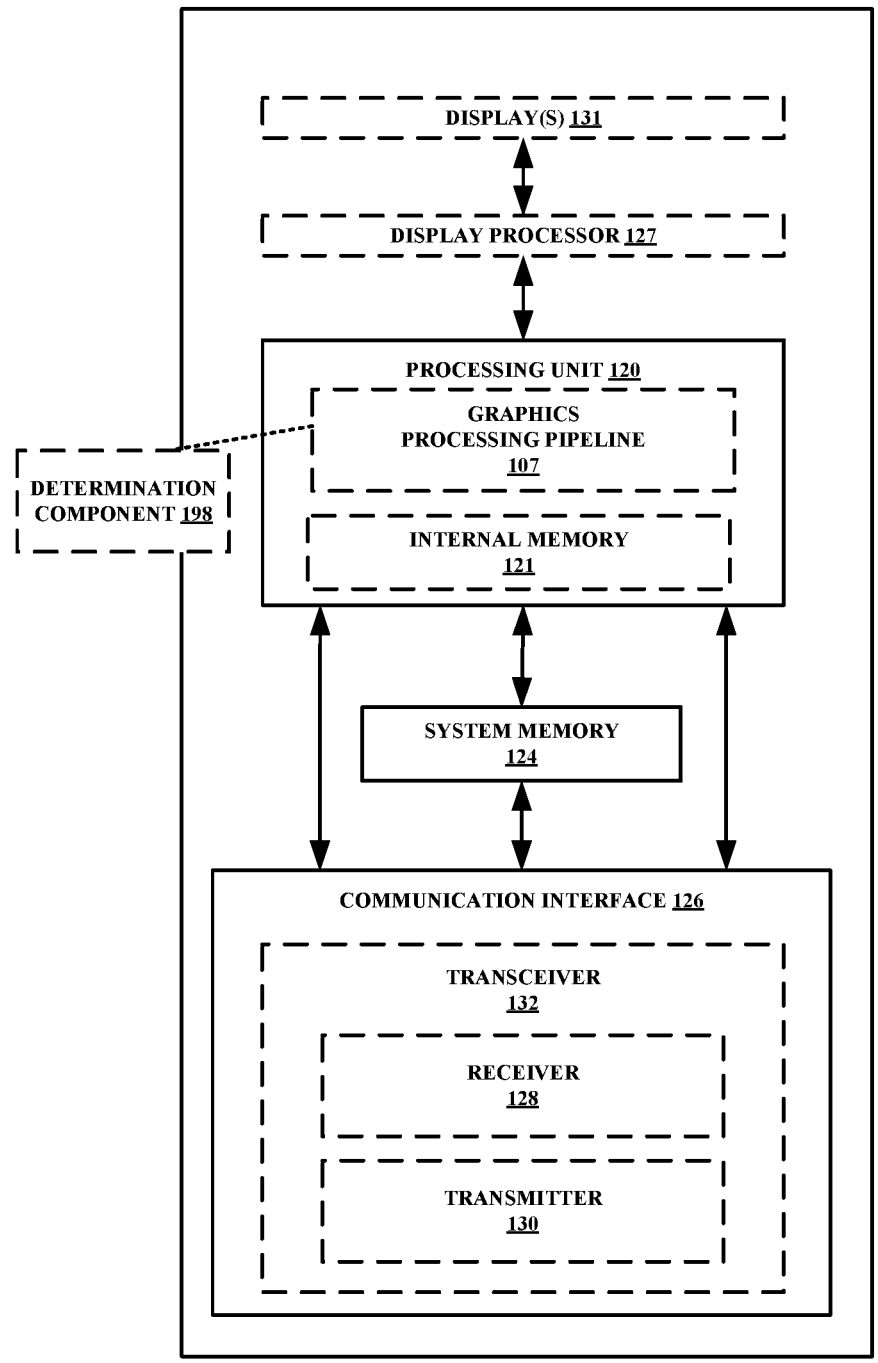
FIG. 1 is a block diagram that illustrates an example content generation system in accordance with one or more techniques of this disclosure.

Aspects of the present disclosure can separate the storage of different types of attributes, e.g., vertex attributes and instance attributes. For example, aspects of the present disclosure can include a dedicated buffer or cache to store instance attributes. By doing so, aspects of the present disclosure can better utilize the GPU cache storage, e.g., by separating the instance attributes from the vertex attributes. Accordingly, by storing the instance attributes in a separate cache or buffer, aspects of the present disclosure can save or better utilize GPU storage space. Storing instance attributes in a separate cache or buffer can also reduce the amount of requests sent between different processing units, which can take up valuable memory or processing bandwidth. Also, including a separate buffer or cache may reduce the amount of internal processing cycles at certain processing units, e.g., processing cycles dedicated for instance attributes. In some instances, the separate buffer or cache to store instance attributes can be integrated into certain processing units.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to the term "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a system memory 124, a communication interface 126, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon.

The processing unit 120 may include an internal memory 121. The processing unit 120 may be configured to perform graphics processing, such as in a graphics processing pipeline 107. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120, such as system memory 124, may be accessible to the processing unit 120. For example, the processing unit 120 may be configured to read from and/or write to external memory, such as the system memory 124. The processing unit 120 may be communicatively coupled to the system memory 124 over a bus. In some examples, the processing unit 120 may be communicatively coupled to each other over the bus or a different connection.

The internal memory 121 and/or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the graphics processing pipeline 107 may include a determination component 198 configured to determine a plurality of attributes. In some aspects, the plurality of attributes can include one or more vertex attributes and one or more instance attributes. The determination component 198 can also be configured to send the plurality of attributes to at least one processing unit. In some aspects, the at least one processing unit can be in a graphics processing pipeline of the GPU. Additionally, the determination component 198 can be configured to store at least one of the plurality of attributes in a buffer of the at least one processing unit. In some aspects, the at least one of the plurality of attributes can include the one or more instance attributes. Also, the determination component 198 can be configured to store at least some of the plurality of attributes in a cache of the at least one processing unit. The determination component 198 can also be configured to determine vertex information of one or more vertices, where the plurality of attributes corresponds to the vertex information of the one or more vertices. In some aspects, when sending the plurality of attributes to the at least one processing unit, the determination component 198 can be configured to retrieve the plurality of attributes from an external memory. Further, the determination component 198 can be configured to generate the buffer of the at least one processing unit at the at least one processing unit. The determination component 198 can also be configured to send at least one request from a VFD to a UCHE.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, an augmented reality device, a virtual reality device, a display or display device, a television, a television set-top box, an intermediate network device, a digital media player, a video streaming device, a content streaming device, an in-car computer, any mobile device, any device configured to generate graphical content, or any device configured to perform one or more techniques described herein.

GPUs according to the present disclosure can include a number of different processing units, such as to drive the operation of a GPU pipeline. In some aspects, the processing units can include a vertex fetcher and decoder (VFD) and/or a level two (L2) cache (UCHE). In some instances, the VFD can fetch or retrieve data from other processing units or other sections of the GPU, such as from an external memory. For instance, the VFD can fetch a number of different attributes from an external memory and/or prepare inputs for other processing units, e.g., a vertex shader (VS).

Figure 2:
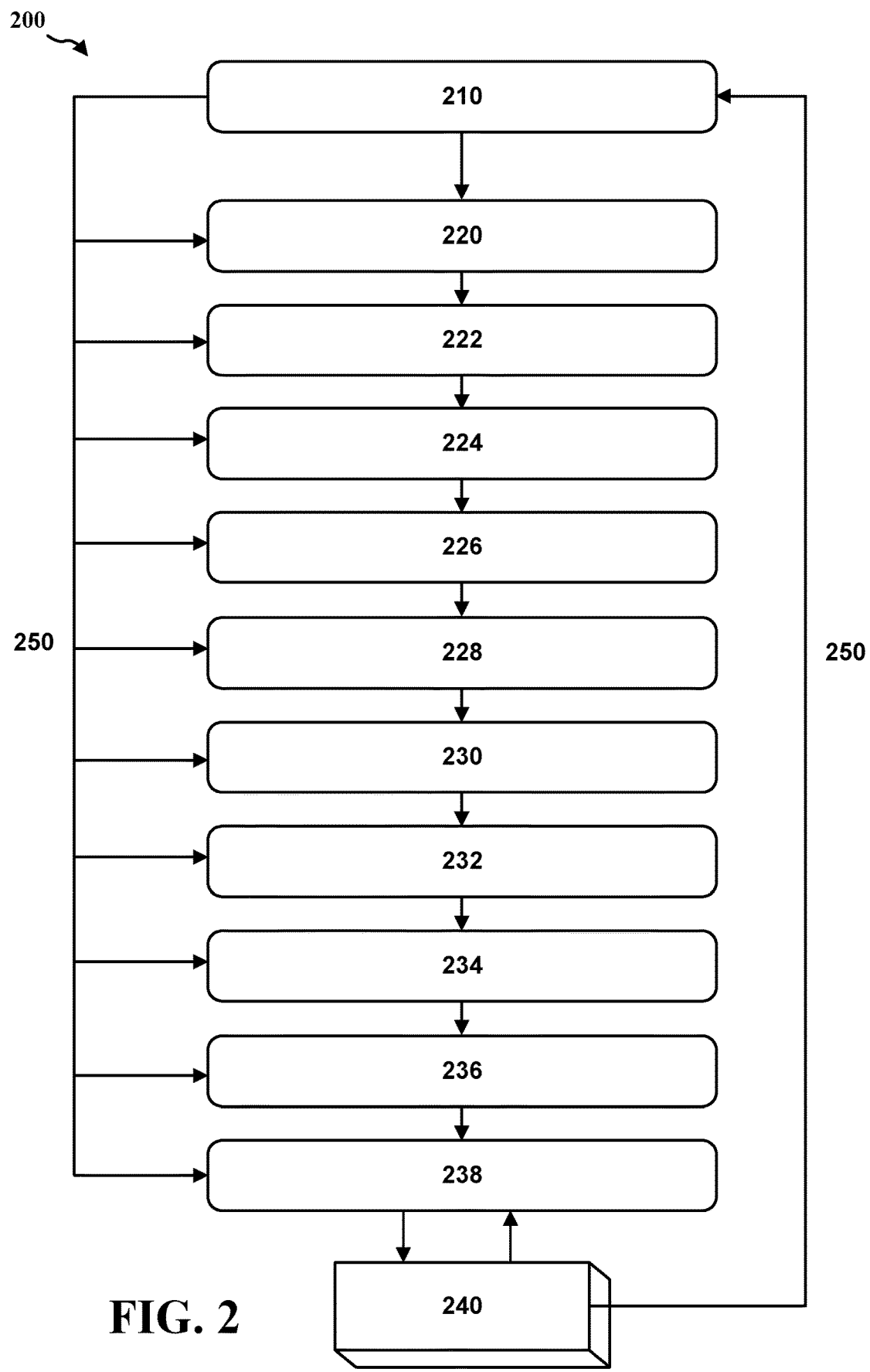
FIG. 2 illustrates an example GPU pipeline in accordance with one or more techniques of this disclosure.

FIG. 2 illustrates an example GPU pipeline 200 in accordance with one or more techniques of this disclosure. As shown in FIG. 2, GPU pipeline 200 can include a number of processing units, e.g., VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, and UCHE 238. GPU pipeline 200 can also include command processor (CP) 210, system memory 240, and data 250.

As shown in FIG. 2, the GPU pipeline 200 can process different types of data 250. For example, as displayed in FIG. 2, GPU pipeline 200 can process data at a number of different processing units or blocks, e.g., processing units 220-238. As certain data may be processed by different processing units, it can take some time for data to process through the entire GPU pipeline. Further, there may be different processing units that are processing different data at the same time. As mentioned above, GPU pipeline 200 can fetch or retrieve a number of different attributes to be processed at the processing units 220-238.

In some instances, GPUs herein can utilize multiple types of attributes, e.g., vertex attributes and instance attributes. The vertex attributes can be referred to as per-vertex attributes and the instance attributes can be referred to as per-instance attributes. In some instances, a vertex attribute may correspond to data for a single vertex, while an instance attribute may correspond to data for multiple vertices. Further, an instance attribute can include a larger group of data compared to a vertex attribute, and an instance attribute can correspond to multiple vertices or vertex points. Accordingly, vertex attributes can include data based on vertices while instance attributes can include data across different vertices. Also, both vertex attributes and instance attributes can be processed by the GPU, e.g., by a shader processor (SP).

As indicated above, different types of attributes can provide different types of data. In some aspects, the aforementioned attributes can be associated with an input stream or input data of the GPU. Accordingly, GPUs herein can utilize multiple types of input data, e.g., vertex attributes and instance attributes. In some aspects, instance attributes may be updated less frequently than vertex attributes. Further, instance attributes can be reused more frequently than vertex attributes. Vertex attributes in a GPU may also outnumber the instance attributes. As such, there may be fewer instance attributes compared to vertex attributes, but they may be reused more frequently.

Some aspects of GPUs herein may also include the ability to store certain data, such as with a cache. In some aspects, GPU caches may not be able to distinguish between vertex attributes and instance attributes. Further, in some aspects, GPUs may use either the vertex attributes or instance attributes. Additionally, some GPUs may utilize both vertex attributes and instance attributes, e.g., as it is pre-defined in the GPU. For example, utilizing vertex attributes and/or instance attributes may be pre-defined at a certain level in the hardware of the GPU.

As mentioned above, some types of GPUs or GPU architecture may not distinguish the between different types of attributes, such as vertex attributes or instance attributes. Also, different processing units can fetch or process different attributes. In some aspects, a level zero (L0) cache, e.g., at a VFD, may be used to store or buffer each of the attributes that are fetched or retrieved by the VFD. In some instances, this VFD L0 cache can store or buffer both vertex attributes and instance attributes.

As mentioned above, instance attributes can be reused for a number of different vertices or functions. In some aspects, the reusable instance attributes may need to be re-fetched. For instance, the instance attributes may be forced out of the L0 cache by other attributes, e.g., vertex attributes or other instance attributes, that are being stored at the L0 cache. As such, these instance attributes that are forced out of the L0 cache may need to be fetched again for later incoming vertices. This forcing out of instance attributes from the L0 cache may lead to the unnecessary re-fetching of these instance attributes. Accordingly, this results in unnecessary work performed by the GPU. In turn, this can lead to redundant memory traffic and/or unnecessary VFD internal processing cycles.

As mentioned herein, the VFD can fetch a variety of different data or attributes relating to vertices or vertex information. As such, the input of the VFD can be vertex data or information. Additionally, a processor controller or CP located in the GPU pipeline can process or drive a variety of different data or information. For example, PCs in GPU pipelines can process or drive the vertices or vertex information. As indicated above, VFDs according to the present disclosure can fetch or retrieve a number of data or attributes. For example, VFDs herein can fetch vertex attributes and instance attributes. As indicated above, in some aspects, vertex attributes can be different for each vertex, while instance attributes can be the same for each vertex. Further, vertex attributes may include vertex information, while instance attributes can include other information, such as information regarding how to shade or draw. For example, when drawing an object or one aspect of an object, instance attributes can provide information on how to draw or shade that object.

As mentioned above, vertex attributes and instance attributes can be processed by the GPU, e.g., by a SP. In some aspects, the unit of processing in the SP can be a dual quad (DQ) unit, which refers to multiple quad units, e.g., eight units. As indicated above, processing units can fetch or retrieve different information from the PC. As the SP utilizes DQ data, aspects of the present disclosure may fetch or collect eight vertices from the PC, as well as fetch or retrieve the data or information for these eight vertices. After doing so, aspects of the present disclosure can process the data or information for the next DQ data. For example, aspects of the present disclosure can fetch or process data for a first DQ, e.g., DQ0, and then fetch or process data for a second DQ, e.g., DQ1. Also, for each DQ, each vertex may include a variety of different attributes, e.g., vertex or instance attributes. In some aspects, in order to fetch or retrieve a certain attribute, the VFD may need additional instructions. For instance, some types of DQ data may include up to 32 different instructions, e.g., instruction 0 (Instr0) through instruction 31 (Inst31). These instructions can indicate the type of attributes that may be fetched from other processing units, e.g., the UCHE. Further, in some aspects, these instructions may come from external memory.

Figure 3:
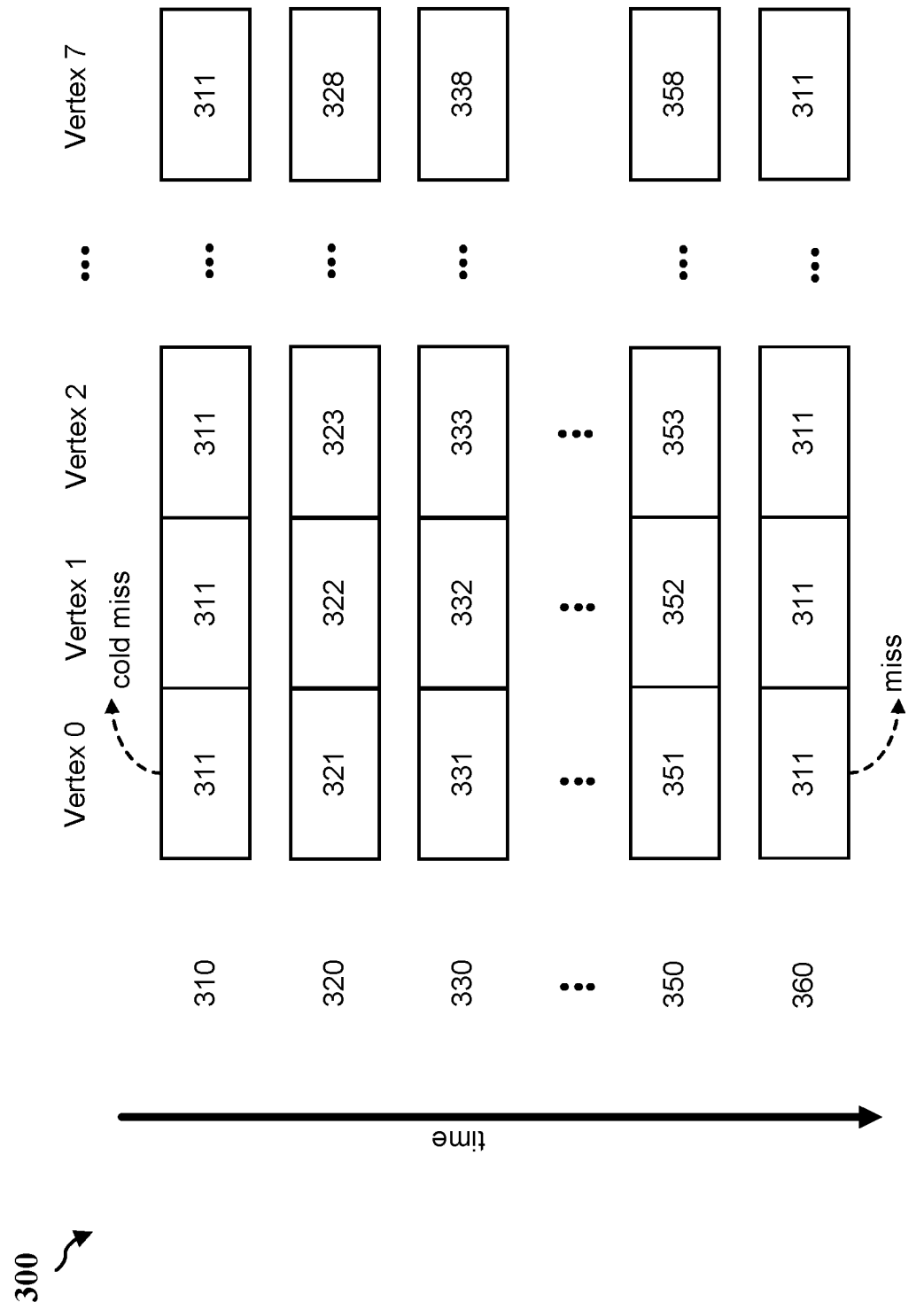
FIG. 3 illustrates an example timing diagram of a GPU in accordance with one or more techniques of this disclosure.

FIG. 3 illustrates an example timing diagram 300 of a GPU in accordance with one or more techniques of this disclosure. As shown in FIG. 3, timing diagram 300 can include a number of different instructions for different DQ data. For example, timing diagram 300 can include a first instruction for a first DQ, e.g., DQ0.Instr0 310. Timing diagram 300 can include a number of different instructions for a first DQ, e.g., DQ0.Instr1 320 and DQ0.Instr2 330, through a thirty-second instruction, e.g., DQ0.Instr31 350. Further, timing diagram 300 can include instructions for a second DQ, e.g., DQ1.Instr0 360. Timing diagram 300 shows that there can be up to 32 different instructions for some types of DQ data.

FIG. 3 also shows that timing diagram 300 includes number of different vertex and instance attributes. As shown in FIG. 3, these attributes can be fetched or collected for eight vertices, e.g., vertex 0-vertex 7. For example, timing diagram 300 includes a first instance attribute (i0 311), which can be the same for all eight vertices. Timing diagram 300 also includes different vertex attributes, e.g., first vertex attribute (a0) through thirty-second attribute (a31). These different vertex attributes can be assigned to each of the eight vertices. Accordingly, DQ0.Instr1 320 can include a first vertex attribute for a first vertex (v0.a0 321), a second vertex (v1.a0 322), a third vertex (v2.a0 323), through an eighth vertex (v7.a0 328). Also, DQ0.Instr2 330 can include a second vertex attribute for a first vertex (v0.a1 331), a second vertex (v1.a1 332), a third vertex (v2.a1 333), through an eighth vertex (v7.a1 338). DQ0.Instr31 350 can include a thirty-second vertex attribute for a first vertex (v0.a31 351), a second vertex (v1.a31 352), a third vertex (v2.a31 353), through an eighth vertex (v7.a31 358).

Additionally, timing diagram 300 displays instructions for a second DQ, e.g., DQ1.Instr0 360, which can include a first instance attribute, e.g., i0 311, which can be the same for all eight vertices. As shown in FIG. 3, different DQ data can include the same instant attribute. As mentioned above, this may be because instance attributes, e.g., i0 311, can be reused a number of different times. In contrast, as shown in FIG. 3, vertex attributes may not be reused, e.g., the first vertex attribute (v0) may be used one time for each of the eight vertices, e.g., v0.a0 321 through v7.a0 328.

As shown in FIG. 3, the vertex processing can be performed using the DQ data. Also, the individual vertex attributes can have different attributes for each vertex. As shown in FIG. 3, each DQ can utilize eight vertices for one attribute. Accordingly, eight vertices can be cached for one type of attribute. For example, as shown in FIG. 3, for a single DQ instruction, e.g., DQ0.Instr1 320, one vertex attribute, e.g., a0, can utilize eight different vertices, e.g., v0.a0 321 through v7.a0 328.

As mentioned above, storing data or instructions in a cache can be a way to temporarily store data that will be processed or used by the GPU. For example, when the data needs to be accessed or fetched by a processing unit, e.g., a VFD, some memory bandwidth can be saved by using a cache. For example, aspects of the present disclosure can use caches with the VFD. Also, in some aspects, if multiple entities are accessing or fetching data from the same cache, then the data may not need to be accessed or fetched multiple times. However, when utilizing a cache with a first-in, first-out (FIFO) format, the data that is currently stored in the cache may be pushed out of the cache by subsequent data.

As shown in FIG. 3, aspects of the present disclosure can store a vertex or instance attribute by using eight different vertices. For example, for one cycle of DQ, e.g., DQ0, the DQ can cache a vertex attribute, e.g., a0, for the eight vertices. For the next cycle, the DQ can cache the next vertex attribute, e.g., a1, for the eight vertices. However, as shown in FIG. 3, instance attributes may use the same attribute for each vertex. For example, instance attribute i0 311 is utilized for all eight vertices. Further, once the present disclosure fetches or collects data for the eight vertices, the DQ cycle can be completed. As shown in FIG. 3, for some DQs, e.g., DQ0, 32 different instructions may need to be collected for the eight vertices. In some aspects, the maximum number of instructions in a DQ, e.g., DQ0, can be 32. However, there can be another number of different instructions in a DQ, e.g., 1, 2, 4, 8, 16, etc. Additionally, as mentioned above, some instance attributes, e.g., i0, may be forced out of the cache as other attributes enter the cache. In some aspects, this can be referred to as a "cold miss" or a "miss" for the attributes, which is shown in FIG. 3 for i0 311.

In some GPUs according to the present disclosure, some caches, e.g., a VFD general cache or level zero (L0) cache ($), can store a mix of vertex and instance attributes. As mentioned above, vertex attributes can be frequently updated with no or few reuses, while instance attributes can be infrequently updated with many reuses. For example, instance attributes can be updated once per cycle or instance identification update, as well as be reused a number of different times. Accordingly, aspects of the present disclosure may need to access the same instance attribute numerous times. As further mentioned above, in a FIFO cache, vertex attributes can push instance attributes out of the cache. For example, in a 12-entry FIFO-type L0 cache that utilizes eight vertices, fetching a few vertex instructions may push out an instance attribute. This can be a problem if the GPU needs to re-access the same instance attribute.

As indicated above, aspects of the present disclosure may utilize caches with a number of different levels. For example, the present disclose can utilize a general cache or L0 cache. Aspects of the present disclosure can also utilize a level one (L1) cache or a level two (L2) cache. In some instances, as the number of the cache increases, e.g., L0, L1, L2, the cache may get closer to the external memory. Accordingly, the L0 cache can be the first level of cache inside a processing unit, e.g., the VFD.

FIGS. 4A-4C illustrate cache 400, cache 410, and cache 420, respectively, of a GPU in accordance with one or more techniques of this disclosure. As shown in FIGS. 4A-4C, cache 400 includes cache slots 409, cache 410 includes cache slots 419, and cache 420 includes cache slots 429. Also, caches 400, 410, 420 include 12 cache slots or entries. Caches 400, 410, 420 can be the same cache, e.g., a 12 depth L0 cache, which is cycling through different attribute data. As shown in FIG. 4A, cache 400 is storing a first instance attribute (i0 411), which can correspond to a first instruction (Instr0) of a first DQ (DQ0). Cache 400 is also storing a first vertex attribute for a first vertex (v0.a0 421), a second vertex (v1.a0 422), a third vertex (v2.a0 423), a fourth vertex (v3.a0 424), a fifth vertex (v4.a0 425), a sixth vertex (v5.a0 426), a seventh vertex (v6.a0 427), and an eighth vertex (v7.a0 428). Each vertex attribute v0.a0 421 through v7.a0 428 can correspond to a second instruction (Instr1) of a first DQ (DQ0).

FIG. 4B shows the next cycle of attributes that are stored in the cache 410. As mentioned above, cache 410 can be the same cache as cache 400, but updated to show a different attribute storage cycle. As shown in FIG. 4B, cache 410 is storing eight new vertex attributes corresponding to a second instruction (Instr1) of DQ0 for the eight vertices. For example, cache 410 is storing a second vertex attribute for a first vertex (v0.a1 431), a second vertex (v1.a1 432), a third vertex (v2.a1 433), a fourth vertex (v3.a1 434), a fifth vertex (v4.a1 435), a sixth vertex (v5.a1 436), a seventh vertex (v6.a1 437), and an eighth vertex (v7.a1 438). Cache 410 is also still storing some vertex attributes from the previous cycle, e.g., v4.a0 425, v5.a0 426, v6.a0 427, and v7.a0 428. These previous attributes are still stored in cache 410 because the cache has 12 entries, but a new DQ instruction may have eight instructions for the eight vertices.

As further shown in FIG. 4B, a number of attributes were pushed out of the cache, e.g., i0 411, v0.a0 421, v1.a0 422, v2.a0 423, and v3.a0 424. As mentioned above, because the cache 410 has 12 entries, and the new cycle includes eight instructions, then the first five previous entries, e.g., i0 411, v0.a0 421, v1.a0 422, v2.a0 423, and v3.a0 424, may be forced out of the cache 410. This is an example of FIFO storage at a cache. For instance, the first attributes stored in the cache are the first attributes pushed out of the cache.

FIG. 4C shows the next cycle of attributes that are stored in the cache 420. As mentioned above, cache 420 can be the same cache as caches 400, 410, but updated to show a different storage cycle. As shown in FIG. 4C, cache 420 is storing eight new vertex attributes corresponding to a thirty-second instruction (Instr31) of DQ0 for the eight vertices. For example, cache 420 is storing a thirty-second vertex attribute for a first vertex (v0.a31 451), a second vertex (v1.a31 452), a third vertex (v2.a31 453), a fourth vertex (v3.a31 454), a fifth vertex (v4.a31 455), a sixth vertex (v5.a31 456), a seventh vertex (v6.a31 457), and an eighth vertex (v7.a31 458). Cache 420 is also still storing some vertex attributes from the previous cycle. For example, cache 420 is storing a thirty-first vertex attribute for a sixth vertex (v5.a30 446), a seventh vertex (v6.a30 447), and an eighth vertex (v7.a30 448). As mentioned above, these previous attributes are still stored in cache 420 because the cache has 12 entries, but a new DQ instruction has eight instructions for the eight vertices.

Additionally, cache 420 is storing the first instance attribute (i0 411) which corresponds to Instr0 of DQ0. Accordingly, aspects of the present disclosure can re-fetch or re-collect some attributes, e.g., i0 411. As mentioned above, instance attributes are more likely to be reused by the present disclosure, so they may need to be re-fetched more often than vertex attributes.

Figure 4:
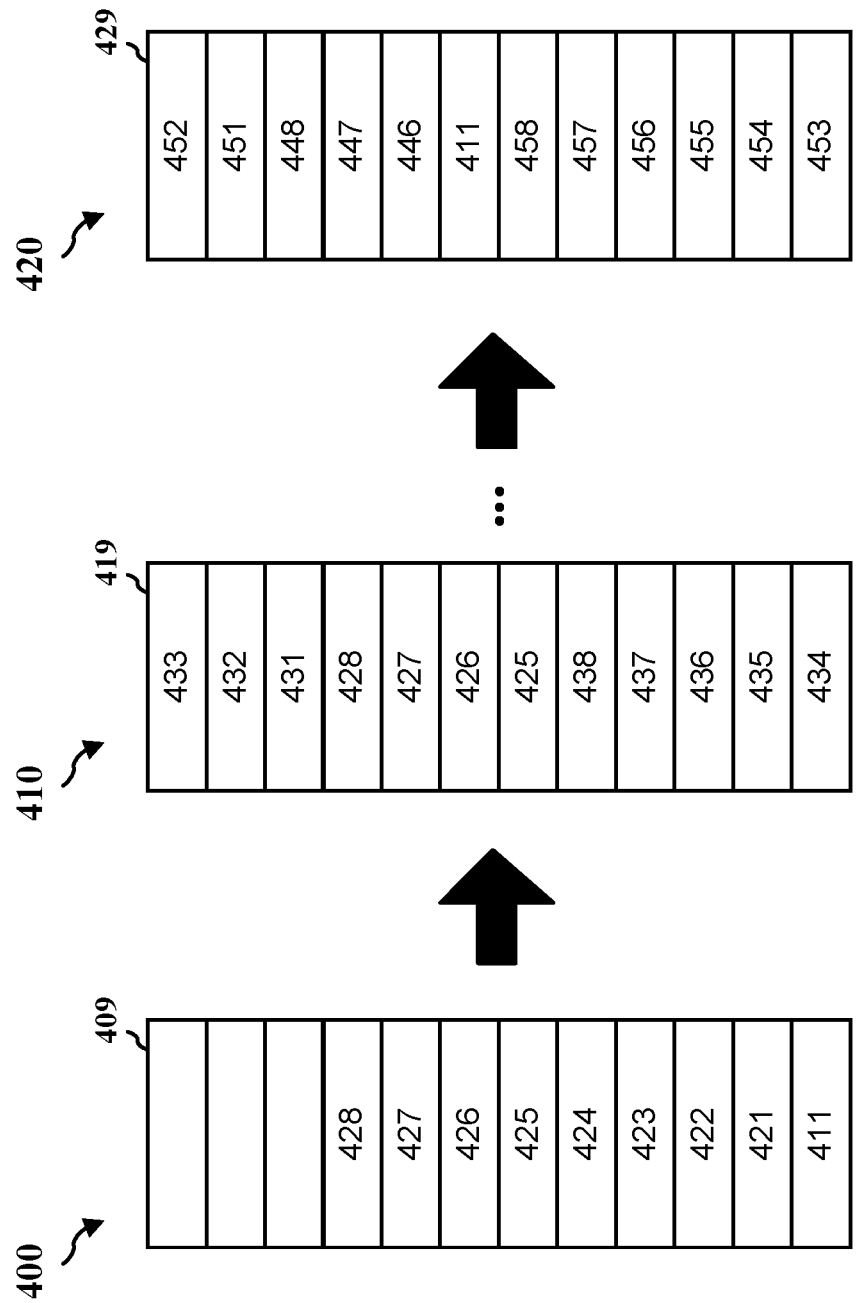
FIGS. 4A-4C illustrate an example cache of a GPU in accordance with one or more techniques of this disclosure.

As shown in FIG. 4, both vertex and instance attributes can be combined in the same general cache, e.g., cache 400, 410, 420. As mentioned above, the problem with including both vertex and instance attributes in the same cache is that the instance attributes, e.g., i0 411, may be kicked out of the cache by the vertex attributes. Based on this, aspects of the present disclosure may re-fetch an instance attribute when needed. In some instances, aspects of the present disclosure may re-fetch an instance attribute once the vertex attributes are finished updated. For example, the instance attribute i0 may be re-fetched after vertex attributes a0-a31 are done updating in the cache. In some aspects, an instance attribute may be re-fetched when a new set of vertex attributes needs to be updated. As shown in FIGS. 4A-4C, because a vertex attribute can take up eight spaces to be stored or processed in a 12 space cache, it may kick out all but the last four entries of the previous attribute.

In some aspects, after the first DQ, e.g., DQ0, is done processing the vertex attributes, the next DQ, e.g., DQ1, may use the same instance attribute, e.g., i0 411. This is shown in FIG. 4C when i0 411 is re-fetched. In some cases, the instance attribute may be re-fetched because the instance attribute includes data needed for processing. As such, aspects of the present disclosure may need to re-fetch the same instance attribute, e.g., i0 411, multiple times. In turn, this can lead to bandwidth and cache utilization issues. Also, because the instance attributes are spaced far apart from each other, the caches, e.g., caches 400, 410, 420, may not be large enough to access the same instance attribute before it is kicked out of the cache by the vertex attributes. For example, cache 420 does not re-fetch instance attribute i0 411 until after the 32 vertex attributes have been processed.

As mentioned above, once an instance attribute is kicked out of the cache, aspects of the present disclosure may not be able to access the instance attribute unless it is re-fetched. This can be because there is not enough space in the cache, e.g., caches 400, 410, 420, to keep the instance attribute, e.g., i0 411, before the vertex attributes force the instance attribute from the cache. In some aspects, the depth of a cache can be decided from certain profiling data. For instance, aspects of the present disclosure may decide the 12 entry size of caches 400, 410, 420 based on the corresponding application or use for the cache. For example, aspects of the present disclosure may select the size of the cache once the corresponding performance increase levels off. Accordingly, aspects of the present disclosure may attempt to find an optimal size of the cache based on certain performance measurements.

In some aspects, the present disclosure may solve the aforementioned cache storage issues by separating the storage of the vertex attributes and the instance attributes. For example, aspects of the present disclosure can include a dedicated buffer in the GPU hardware to store the instance attributes. By doing so, aspects of the present disclosure can better utilize the GPU cache storage, e.g., by separating the instance attributes from the vertex attributes. Accordingly, by storing the instance attributes in a separate cache or buffer, aspects of the present disclosure can save or better utilize GPU storage space.

Some aspects of the present disclosure can optimize the attribute fetching process, e.g., by storing vertex attributes in one cache and storing instance attributes in an additional buffer or cache. As such, aspects of the present disclosure can include an instance attribute buffer (IAB) to store the instance attributes for future reuse. By separating the storage of vertex and instance attributes, e.g., by utilizing an IAB, the instance attributes may not be kicked out of a cache by the vertex attributes. In some instances, the separate instance attribute buffer or IAB may be updated when an instance identification (ID) changes or a new draw call enters the GPU pipeline.

As mentioned above, aspects of the present disclosure can utilize a separate buffer or IAB in order to optimize the storage of instance attributes. In some aspects, including a separate buffer or IAB may reduce the amount of requests sent from the VFD to the UCHE, which can take up valuable memory or processing bandwidth. Also, including a separate buffer or IAB may reduce the amount of internal processing cycles at certain processing units, e.g., VFD processing cycles dedicated for instance attributes. As such, aspects of the present disclosure can add a dedicated buffer or cache to store instance attributes. In some instances, the separate buffer or IAB can be integrated in certain processing units, e.g., the VFD.

Referring back to FIG. 2, the GPU pipeline can include a number of different processing units, such as a VFD and a UCHE. In some aspects, the VFD can be connected or adjacent to the UCHE in the GPU pipeline. As indicated above, aspects of the present disclosure can reduce the amount of VFD-to-UCHE requests when fetching attribute data. In some aspects, including an IAB at the VFD can reduce the amount of requests from the VFD to the UCHE. In some instances, the VFD-to-UCHE requests may allow the vertex data to be fetched, as the GPU may need to include some data from an external memory for vertex processing. As indicated above, the UCHE can be connected to a system memory or external memory. Accordingly, in some aspects, the present disclosure may send a request form the VFD to the UCHE in order to fetch external memory data. Additionally, as mentioned above, aspects of the present disclosure can reduce the amount of VFD internal processing cycles for fetching and/or decoding instance attributes.

In some aspects of the present disclosure, a cache or buffer may store data or attributes temporarily. Additionally, by using a buffer or cache, aspects of the present disclosure may be able to determine which data or attributes will be stored next. Further, buffers can more easily predict the type of data that will be utilized next. In some instances, aspects of the present disclosure can store the instance attribute data in a buffer because it can be easily re-accessed. As mentioned above, instance attributes can be reused many times for many vertices, but vertex attributes may be used once per vertex. As such, aspects of the present disclosure may store the instance attributes in a buffer so they can be re-accessed and/or reused for many vertices.

Figure 5:
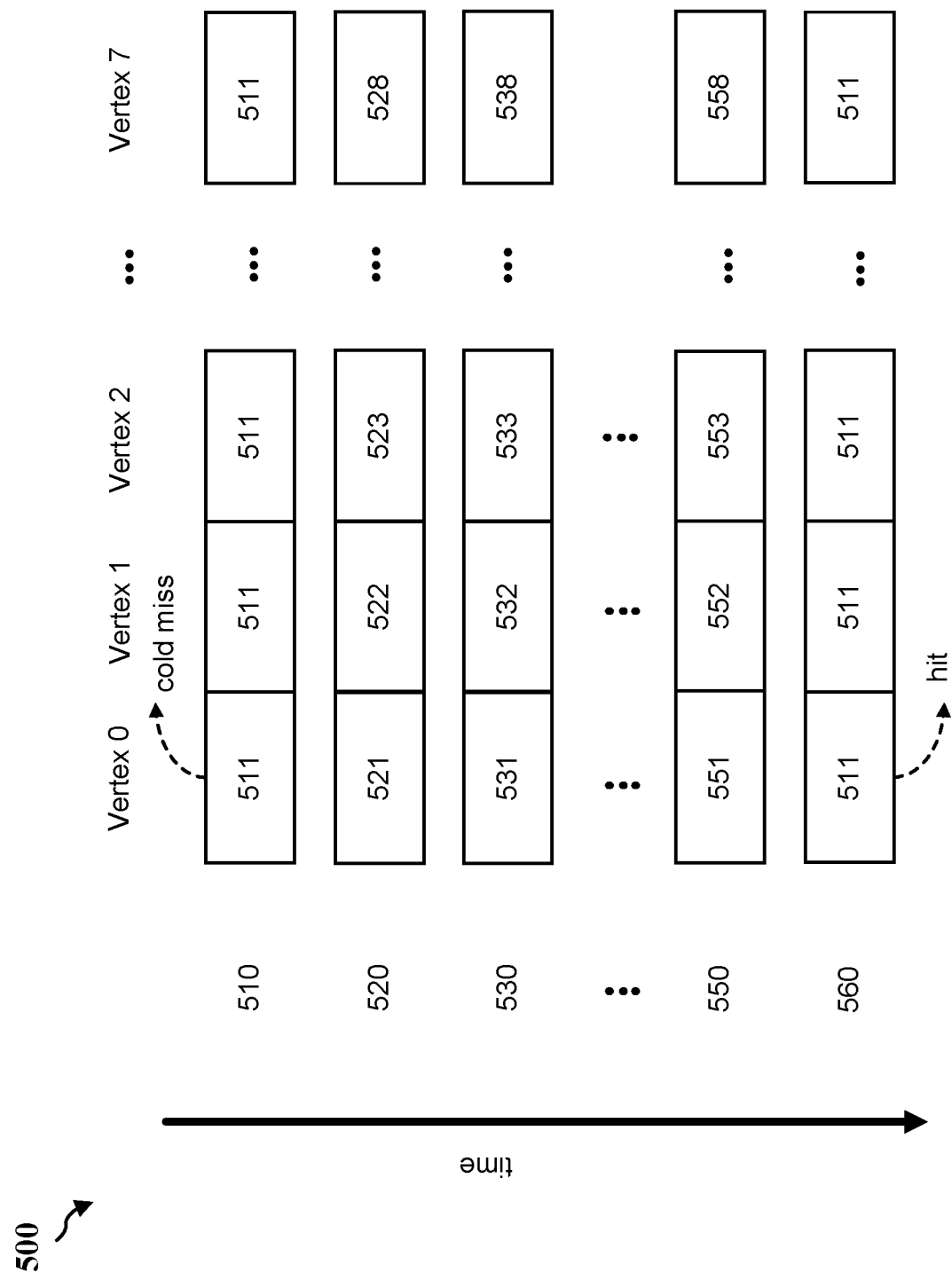
FIG. 5 illustrates an example timing diagram of a GPU in accordance with one or more techniques of this disclosure.

FIG. 5 illustrates an example timing diagram 500 of a GPU in accordance with one or more techniques of this disclosure. As shown in FIG. 5, timing diagram 500 can include a number of different instructions for different DQ data. For example, timing diagram 500 can include a first instruction for a first DQ, e.g., DQ0.Instr0 510. Timing diagram 500 can include a number of different instructions for a first DQ, e.g., DQ0.Instr1 520 and DQ0.Instr2 530, through a thirty-second instruction for the first DQ, e.g., DQ0.Instr31 550. Further, timing diagram 500 can include a first instruction for a second DQ, e.g., DQ1.Instr0 560. Timing diagram 500 shows that there can be up to 32 different instructions for some types of DQ data.

FIG. 5 also shows that timing diagram 500 includes number of different vertex and instance attributes. As shown in FIG. 5, these attributes can be fetched or collected for eight vertices, e.g., vertex 0-vertex 7. For example, timing diagram 500 includes a first instance attribute (i0 511), which can be the same for all eight vertices. Timing diagram 500 also includes different vertex attributes, e.g., a first vertex attribute (a0) through a thirty-second attribute (a31). These different vertex attributes can be assigned to each of the eight vertices. Accordingly, DQ0.Instr1 520 can include first vertex attribute for a first vertex (v0.a0 521), a second vertex (v1.a0 522), a third vertex (v2.a0 523), through an eighth vertex (v7.a0 528). Also, DQ0.Instr2 530 can include second vertex attribute for a first vertex (v0.a1 531), a second vertex (v1.a1 532), a third vertex (v2.a1 533), through an eighth vertex (v7.a1 538). DQ0.Instr31 550 can include thirty-second vertex attribute for a first vertex (v0.a31 551), a second vertex (v1.a31 552), a third vertex (v2.a31 553), through an eighth vertex (v7.a31 558).

Additionally, timing diagram 500 displays instructions for a second DQ, e.g., DQ1.Instr0 560, which can include a first instance attribute, e.g., i0 511, that can be the same for all eight vertices. As shown in FIG. 5, different DQ data can include the same instant attribute. As mentioned above, this can be because instance attributes, e.g., i0 511, can be reused a number of different times. In contrast, as shown in FIG. 5, vertex attributes may not be reused, e.g., the first vertex attribute (v0) may be used one time for the eight vertices, e.g., v0.a0 521 through v7.a0 528. As shown in FIG. 5, the vertex processing can be performed using the DQ data. Also, the individual vertex attributes can have different attributes for each vertex. As shown in FIG. 5, each DQ can utilize eight vertices for one attribute. Accordingly, eight vertices can be cached for one type of attribute. For example, as shown in FIG. 5, for a single DQ instruction, e.g., DQ0.Instr1 520, one vertex attribute, e.g., a0, can utilize eight different vertices, e.g., v0.a0 521 through v7.a0 528.

FIG. 5 may appear similar to previous FIG. 3. However, FIG. 5 shows that the instance attribute is not re-fetched, whereas in FIG. 3 the instance attribute does need to be re-fetched. For example, FIG. 5 shows that i0 511 is not re-fetched at DQ1.Inst0 560, i.e., i0 511 is "hit" at DQ1.Inst0 560. This can be because the data for the instance attribute i0 511 is stored in a separate cache or buffer, e.g., an IAB. As i0 511 is stored in an IAB, it is stored separately from the vertex attributes. Accordingly, the instance attribute i0 511 will not be kicked out of the buffer or IAB by vertex attributes, so it will not need to be re-fetched. As the i0 511 data is stored in the IAB, the i0 511 data is "hit" at the next DQ and does not need to be re-fetched. As mentioned above, this can save valuable memory or processing bandwidth.

Figure 6:
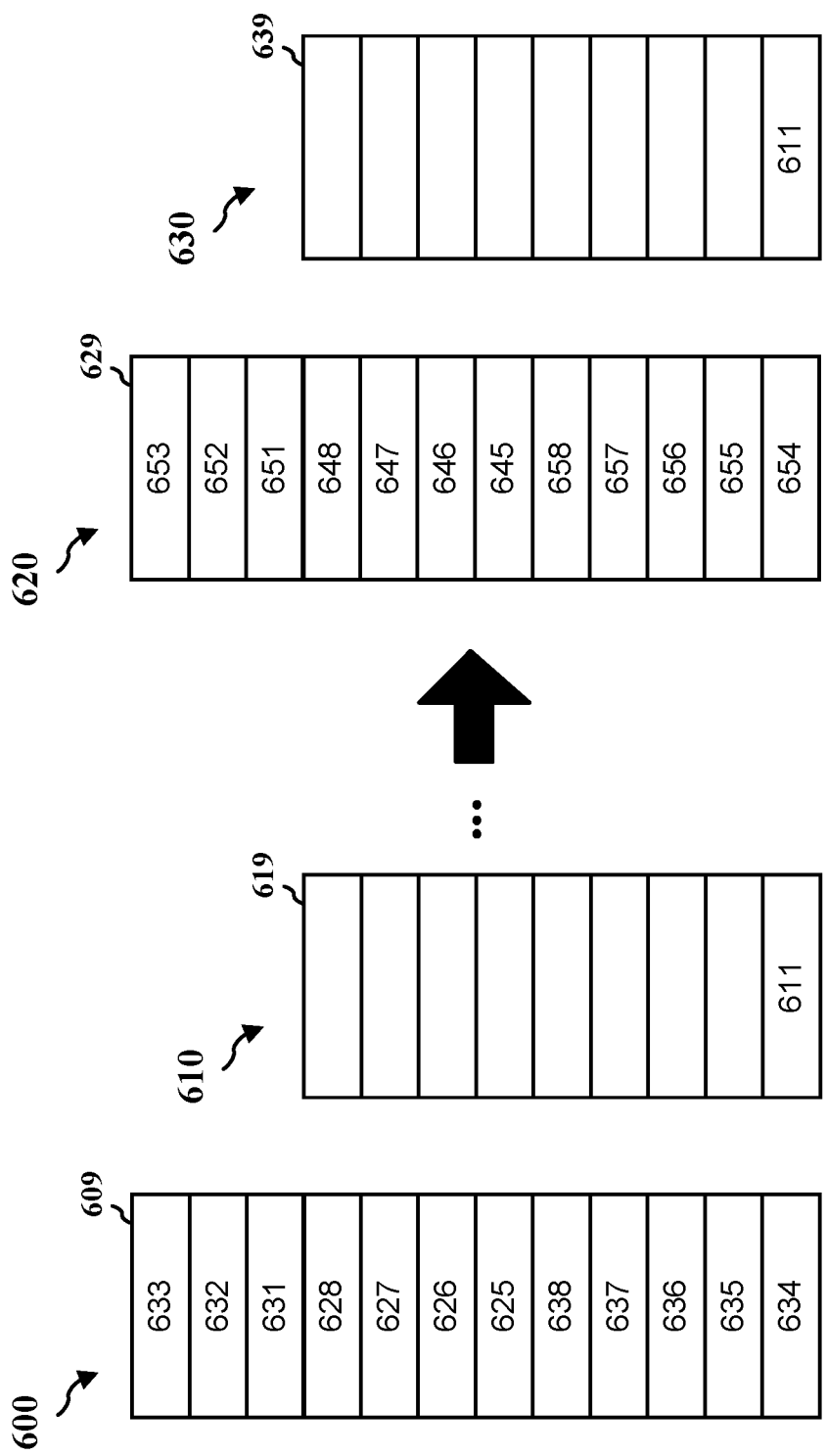
FIGS. 6A and 6B illustrate an example cache and buffer of a GPU in accordance with one or more techniques of this disclosure.

FIGS. 6A and 6B illustrate an example cache 600 and cache 620, respectively, and buffer 610 and buffer 630, respectively, of a GPU in accordance with one or more techniques of this disclosure. As shown in FIGS. 6A and 6B, cache 600 includes cache slots 609 and cache 620 includes cache slots 629. Also, caches 600 and 620 include 12 cache slots or entries. As further shown in FIGS. 6A and 6B, buffer 610 includes buffer slots 619 and buffer 630 includes buffer slots 639. Buffers 610 and 630 can include nine buffer slots or entries. Caches 600, 620 can be the same cache, e.g., a 12 depth L0 cache, which is storing and cycling through different attribute data. Likewise, buffers 610, 630 can be the same buffer, e.g., a 9 depth IAB, which is storing instance attributes.

As shown in FIG. 6A, buffer 610 is storing a first instance attribute (i0 611), which can correspond to a first instruction (Instr0) of a first DQ (DQ0). Cache 600 is storing a first vertex attribute for a fifth vertex (v4.a0 625), a sixth vertex (v5.a0 626), a seventh vertex (v6.a0 627), and an eighth vertex (v7.a0 628). Each vertex attribute v4.a0 425 through v7.a0 428 can correspond to a second instruction (Instr1) of a first DQ (DQ0). Cache 600 is also storing a second vertex attribute for a first vertex (v0.a1 631), a second vertex (v1.a1 632), a third vertex (v2.a1 633), a fourth vertex (v3.a1 634), a fifth vertex (v4.a1 635), a sixth vertex (v5.a1 636), a seventh vertex (v6.a1 637), and an eighth vertex (v7.a1 638). The first vertex attributes, e.g., v4.a0 625, v5.a0 626, v6.a0 627, and v7.a0 628, can be from a previous cycle.

As mentioned above, these previous attributes are stored in cache 600 because the cache has 12 entries, but a new DQ instruction may have eight instructions for the eight vertices. As indicated in FIG. 6A, a number of previous vertex attributes were pushed out of the cache, e.g., a first vertex attribute for a first, second, third, and fourth vertex (v0.a0 621, v1.a0 622, v2.a0 623, and v3.a0 624 (not shown)). As mentioned above, this is an example of FIFO storage at cache 600. For instance, the first attributes stored in the cache are the first attributes pushed out of the cache.

FIG. 6B shows a later cycle of attributes that are stored in the cache 620. As mentioned above, cache 620 is the same cache as cache 600, but updated to show a different storage cycle. As shown in FIG. 6B, cache 600 is storing eight new vertex attributes corresponding to a thirty-second instruction (Instr31) of DQ0 for the eight vertices. For example, cache 620 is storing a thirty-second vertex attribute for a first vertex (v0.a31 651), a second vertex (v1.a31 652), a third vertex (v2.a31 653), a fourth vertex (v3.a31 654), a fifth vertex (v4.a31 655), a sixth vertex (v5.a31 656), a seventh vertex (v6.a31 657), and an eighth vertex (v7.a31 658). Cache 620 is also still storing some vertex attributes from the previous cycle. For example, cache 620 is storing a thirty-first vertex attribute for a fifth vertex (v4.a30 645), sixth vertex (v5.a30 646), a seventh vertex (v6.a30 647), and an eighth vertex (v7.a30 648). As mentioned above, these previous attributes are still stored in cache 620 because the cache has 12 entries, but a new DQ instruction may have eight instructions for the eight vertices.

As shown in FIGS. 6A and 6B, the first instance attribute i0 611 is stored in buffer 610 and 630, respectively. First instance attribute i0 611 corresponds to Instr0 of DQ0. Also, buffers 610, 630 may be instance attribute buffers, so they may be referred to as IABs 610, 630. As shown in FIG. 6A, vertex and instance attributes are separated from each other and stored in cache 600 and buffer 610, respectively. Likewise, as shown in FIG. 6B, vertex and instance attributes are separated from each other in cache 620 and buffer 630. By separating the vertex and instance attributes in a different cache and buffer, the instance attributes, e.g., i0 611, will not be kicked out of the cache or buffer by the vertex attributes. Based on this, aspects of the present disclosure may not need to re-fetch instance attribute i0 611 when needed. As mentioned above, instance attributes are more likely to be reused by the present disclosure, so they may be reused more often than vertex attributes.

In some aspects, after the first DQ, e.g., DQ0, is done processing the vertex attributes, the next DQ, e.g., DQ1, may use the same instance attribute, e.g., i0 611. As shown in FIGS. 6A and 6B, the instance attribute i0 611 may not need to be re-fetched because the instance attribute is stored separately from the vertex attributes in buffer 610, 630. Accordingly, aspects of the present disclosure can reuse the instance attribute i0 611 without needing to re-fetch the data. Based on this, aspects of the present disclosure can save valuable memory and processing bandwidth.

As indicated above, aspects of the present disclosure can add an IAB or buffer 610, 630 to store instance attribute data. By separating the instance attribute data from the vertex attribute data, the instance attribute data can be easily re-accessed or reused. Accordingly, when fetching an instance attribute, e.g., i0 611, such as from an external memory, aspects of the present disclosure can store the instance attribute in an IAB, e.g., buffer 610, 630, rather than in a cache, e.g., cache 600, 620. Moreover, as the instance attribute, e.g., i0 611, is fetched and stored in an IAB, aspects of the present disclosure can reduce the need to perform unnecessary fetching or decoding operations, e.g., by re-fetching and re-decoding the instance attribute. Accordingly, aspects of the present disclosure can load the instance attribute, e.g., i0 611, from the dedicated buffer or IAB, e.g., buffer 610, 630, when the instance attribute data is needed. As the instance attribute i0 611 is stored in its own dedicated buffer 610, 630, it can be easily accessed when needed, e.g., without the need to re-fetch and re-decode the data.

As mentioned herein, the caches of the present disclosure, e.g., cache 600, 620, may be used to store the vertex attributes. Also, the IABs of the present disclosure, e.g., buffer 610, 630, can store the instance attributes. By doing so, aspects of the present disclosure may fetch the instance attribute data once, and it can be reused when needed. Indeed, the instance attribute data will not be kicked out of the IAB or buffer 610, 630 by any vertex attribute data. As mentioned above, this is beneficial as instance attributes are infrequently updated and have many uses, so they may need to be re-accessed frequently. By storing the instance attributes in a dedicated buffer, e.g., buffer, 610, 630, aspects of the present disclosure can reduce the amount of memory requests needed when re-fetching the data. For example, aspects of the present disclosure can reduce the number of requests from the VFD to the UCHE, e.g., instance attribute requests.

IABs or buffers of the present disclosure can have multiple storage spaces or slots.

For example, as shown in FIGS. 6A and 6B, buffers 610, 630 can have multiple buffer slots 619, 639, e.g., nine slots. As instance attributes can have multiple entries, buffers with multiple slots can be beneficial for storing the instance attributes. In some applications, IABs or buffers according to the present disclosure can have an amount of slots equal to the maximum number of instance attribute instructions. For example, some applications, e.g., certain types of gaming, can have nine buffer or IABs slots, as there are a maximum of nine instance attribute instructions. However, in other applications there may be more buffer or IAB slots, e.g., 32, as there are more instance attributes instructions. In some aspects, if all of the buffer slots 619, 639 in the buffer 610, 630 are filled with instance attributes, then any excess instance attributes can be stored in the cache 600, 620.

As shown in FIGS. 6A and 6B, aspects of the present disclosure may generate a buffer, e.g., buffer 610, 630, of at least one processing unit, e.g., a VFD. Aspects of the present disclosure can also determine a plurality of attributes including one or more vertex attributes, e.g., vertex attributes 625-628, 631-638, 645-648, 651-658, and one or more instance attributes, e.g., instance attribute 611. Also, aspects of the present disclosure can send the plurality of attributes, e.g., attributes 611, 625-628, 631-638, 645-648, 651-658, to at least one processing unit, e.g., a VFD, in a graphics processing pipeline of the GPU. As further shown in FIGS. 6A and 6B, aspects of the present disclosure can also store at least one of the plurality of attributes in a buffer, e.g., buffer 610, 630, of the at least one processing unit, where the at least one of the plurality of attributes includes the one or more instance attributes, e.g., instance attribute 611.

As shown in FIGS. 6A and 6B, aspects of the present disclosure may store at least some of the plurality of attributes in a cache, e.g., cache 600, 620, of the at least one processing unit, e.g., a VFD, where the at least some of the plurality of attributes include the one or more vertex attributes, e.g., vertex attributes 625-628, 631-638, 645-648, 651-658. Additionally, aspects of the present disclosure can determine vertex information of one or more vertices, e.g., vertices 0-7 shown in FIG. 5, where the plurality of attributes corresponds to the vertex information of the one or more vertices. In some aspects, the vertex information of the one or more vertices, e.g., vertices 0-7 shown in FIG. 5, can be determined by a primitive controller (PC).

As shown in FIGS. 6A and 6B, when sending the plurality of attributes to the at least one processing unit, aspects of the present disclosure can retrieve the plurality of attributes, e.g., attributes 611, 625-628, 631-638, 645-648, 651-658, from an external memory. As shown in FIGS. 6A and 6B, the buffer, e.g., buffer 610, 630, of the at least one processing unit can include one or more buffer slots, e.g., buffer slots 619, 639. Each of the one or more instance attributes, e.g., instance attribute 611, can be stored in one of the one or more buffer slots, e.g., buffer slots 619, 639. As further shown in FIGS. 6A and 6B, the cache, e.g., cache 600, 620, of the at least one processing unit can include one or more cache slots, e.g., cache slots 609, 629. Additionally, each of the one or more instance attributes, e.g., instance attribute 611, can be retrieved from the one or more buffer slots, e.g., buffer slots 619, 639, when the one or more instance attributes, e.g., instance attribute 611, are stored in the buffer slots. Each of the one or more vertex attributes, e.g., vertex attributes 625-628, 631-638, 645-648, 651-658, can be stored in one of the one or more cache slots, e.g., cache slots 609, 629. Also, each of the one or more vertex attributes, e.g., vertex attributes 625-628, 631-638, 645-648, 651-658, can be retrieved from the one or more cache slots, e.g., cache slots 609, 629, when the one or more vertex attributes, e.g., vertex attributes 625-628, 631-638, 645-648, 651-658, are stored in the cache slots. In some aspects, the at least one processing unit can include a VFD. Additionally, aspects of the present disclosure can also send at least one request from the VFD to a UCHE.

As mentioned herein, adding the IAB or buffer 610, 630 can reduce the need to re-fetch or decode instance attribute data, which can in turn reduce the amount of VFD internal processing cycles. For example, in order to fetch or decode data, the VFD may perform several processing cycles, e.g., one processing cycle to fetch the data and one processing cycle to decode the data. In order to fetch data, an address computation and/or memory requests may be necessary. In order to decode data, the VFD may need to convert the data. Accordingly, VFD internal processing can be used to process memory data to fetch the vertex data. For instance, after fetching the data, the VFD may process the data in order to send it to the next processing unit in the pipeline, e.g., a shader or shader processor (SP).

As indicated above, aspects of the present disclosure can store the instance attribute data in a dedicate buffer, e.g., buffer 620, 630, thus eliminating the need to re-fetch and re-decode the data. By adding a dedicated buffer or IAB, aspects of the present disclosure can reduce the amount of memory, processing speed, or costs due to unnecessarily re-fetching data. Also, adding a dedicated buffer or IAB can reduce the amount of re-fetching cycles, which can reduce the amount of power needed.

The aforementioned method can isolate instance attributes from vertex attributes by using an IAB or buffer 610, 630 for instance attributes and a cache 600, 620 for vertex attributes. Also, an IAB or buffer 610, 630 may allow the instance attributes to be fetched once per instance identification change, as well as be stored in the IAB or buffer 610, 630 until it becomes full. Aspects of the present disclosure can also change the pre-fetch instruction scheme to skip unnecessary instance instructions, e.g., between instance identification changes. Moreover, an IAB or buffer 610, 630 can increase the amount of open cache slots 609, 629 in cache 600, 620, as the instance attributes may not be stored in the cache 600, 620.

As mentioned above, aspects of the present disclosure can reduce the amount of VFD to UCHE requests. For example, aspects of the present disclosure can reduce the amount of VFD to UCHE requests by a measurable percentage, e.g., 6.6%. In turn, this can reduce the amount of memory bandwidth by a measurable percentage, e.g., by 6.6%. Also, reducing the amount of VFD to UCHE requests can open up memory or processing bandwidth at the UCHE. In turn, this can allow other processing units to utilize the UCHE performance. Additionally, reducing the amount of VFD to UCHE requests or throughput can allow other aspects of the GPU to save memory or processing bandwidth.

Aspects of the present disclosure can significantly reduce the amount of VFD to UCHE memory traffic. Aspects of the present disclosure can also reduce the number of VFD internal processing cycles by removing redundant instance attribute fetching operations. Also, by adding a dedicated buffer or IAB, aspects of the present disclosure can reduce the amount of memory, processing speed, or costs due to unnecessarily re-fetching data. Further, aspects of the present disclosure can reduce the amount of instance attribute instruction processing cycles, e.g., by one processing cycle per DQ.

Figure 7:
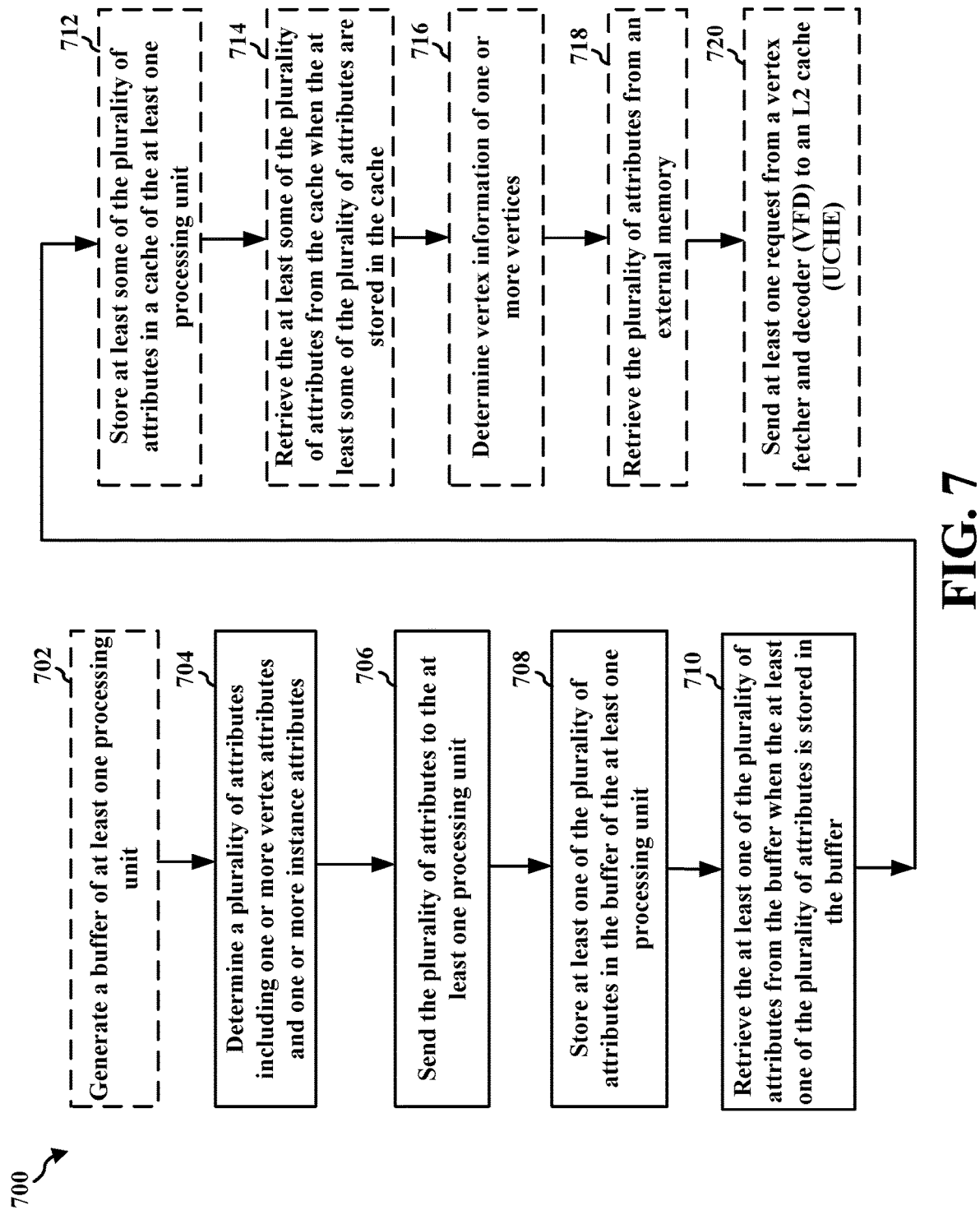
FIG. 7 illustrates an example flowchart of an example method in accordance with one or more techniques of this disclosure.

FIG. 7 illustrates an example flowchart 700 of an example method in accordance with one or more techniques of this disclosure. The method may be performed by a GPU or apparatus for graphics processing. At 702, the apparatus may generate a buffer of the at least one processing unit at the at least one processing unit, as described in connection with the examples in FIGS. 2-6. At 704, the apparatus can determine a plurality of attributes, as described in connection with the examples in FIGS. 2-6. In some aspects, the plurality of attributes can include one or more vertex attributes and one or more instance attributes, as described in connection with the examples in FIGS. 2-6. At 706, the apparatus can send the plurality of attributes to at least one processing unit, where the at least one processing unit is in a graphics processing pipeline of the GPU, as described in connection with the examples in FIGS. 2-6. At 708, the apparatus can store at least one of the plurality of attributes in a buffer of the at least one processing unit, as described in connection with the examples in FIGS. 2-6. In some aspects, the at least one of the plurality of attributes includes the one or more instance attributes, as described in connection with the examples in FIGS. 2-6. At 710, the apparatus can retrieve the at least one of the plurality of attributes from the buffer when the at least one of the plurality of attributes is stored in the buffer, as described in connection with the examples in FIGS. 2-6.

At 712, the apparatus can store at least some of the plurality of attributes in a cache of the at least one processing unit, as described in connection with the examples in FIGS. 2-6. In some instances, the at least some of the plurality of attributes stored in the cache of the at least one processing unit can include the one or more vertex attributes, as described in connection with the examples in FIGS. 2-6. At 714, the apparatus can retrieve the at least some of the plurality of attributes from the cache when the at least some of the plurality of attributes are stored in the cache, as described in connection with the examples in FIGS. 2-6. At 716, the apparatus can determine vertex information of one or more vertices, where the plurality of attributes corresponds to the vertex information of the one or more vertices, as described in connection with the examples in FIGS. 2-6. In some aspects, the vertex information of the one or more vertices is determined by a primitive controller (PC), as described in connection with the examples in FIGS. 2-6.

At 718, when sending the plurality of attributes to the at least one processing unit, the apparatus can retrieve the plurality of attributes from an external memory, as described in connection with the examples in FIGS. 2-6. In some aspects, the buffer of the at least one processing unit can include one or more buffer slots, where each of the one or more instance attributes can be stored in one of the one or more buffer slots, as described in connection with the examples in FIGS. 2-6. Additionally, the cache of the at least one processing unit can include one or more cache slots, where each of the one or more vertex attributes can be stored in one of the one or more cache slots, as described in connection with the examples in FIGS. 2-6. In some aspects, the at least one processing unit can include a VFD, as described in connection with the examples in FIGS. 2-6. At 720, the apparatus can send at least one request from the VFD to a UCHE, as described in connection with the examples in FIGS. 2-6.

In one configuration, a method or apparatus for operation of a GPU is provided. The apparatus may be a GPU or some other processor in graphics processing. In one aspect, the apparatus may be the processing unit 120 within the device 104, or may be some other hardware within device 104 or another device. The apparatus may include means for determining a plurality of attributes, where the plurality of attributes includes one or more vertex attributes and one or more instance attributes. The apparatus can also include means for sending the plurality of attributes to at least one processing unit, where the at least one processing unit is in a graphics processing pipeline of the GPU. Also, the apparatus can include means for storing at least one of the plurality of attributes in a buffer of the at least one processing unit, where the at least one of the plurality of attributes includes the one or more instance attributes. The apparatus can also include means for retrieving the at least one of the plurality of attributes from the buffer when the at least one of the plurality of attributes is stored in the buffer. The apparatus can also include means for storing at least some of the plurality of attributes in a cache of the at least one processing unit. The apparatus can also include means for retrieving the at least some of the plurality of attributes from the cache when the at least some of the plurality of attributes are stored in the cache. Further, the apparatus can include means for determining vertex information of one or more vertices, where the plurality of attributes corresponds to the vertex information of the one or more vertices. The means for sending the plurality of attributes to the at least one processing unit can be further configured to retrieve the plurality of attributes from an external memory. The apparatus can also include means for generating the buffer of the at least one processing unit at the at least one processing unit. The apparatus can also include means for sending at least one request from a VFD to a UCHE.

The subject matter described herein can be implemented to realize one or more benefits or advantages. For instance, the described graphics processing techniques can be used by GPUs or other graphics processors to enable increased data processing, such as by increasing the processing speed of the GPU. This can also be accomplished at a low cost compared to other graphics processing techniques. Also, the graphics processing techniques herein can reduce the amount of memory bandwidth used by the GPU. Moreover, the graphics processing techniques herein can improve the resource or data utilization and/or resource efficiency of the GPU.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily need realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method of operation of a graphics processing unit (GPU), comprising:
   determining a plurality of attributes including one or more vertex attributes for a single vertex and one or more instance attributes that include data for a plurality of vertices including the single vertex;
   sending the plurality of attributes to at least one processing unit, wherein the at least one processing unit is in a graphics processing pipeline of the GPU;
   separating the plurality of attributes between the one or more vertex attributes and the one or more instance attributes;
   storing the one or more instance attributes in a buffer of the at least one processing unit;
   storing the one or more vertex attributes in a cache of the at least one processing unit that is separate from the buffer; and
   retrieving at least one of the one or more instance attributes from the buffer when the one or more instance attributes is stored in the buffer.

2. The method of claim 1, further comprising:
   retrieving the at least some of the plurality of attributes from the cache when the at least some of the plurality of attributes are stored in the cache.

3. The method of claim 2, wherein the cache of the at least one processing unit includes one or more cache slots, wherein each of the one or more vertex attributes are stored in one of the one or more cache slots.

4. The method of claim 1, further comprising:
   determining vertex information of one or more vertices, wherein the plurality of attributes corresponds to the vertex information of the one or more vertices.

5. The method of claim 4, wherein the vertex information of the one or more vertices is determined by a primitive controller (PC).

6. The method of claim 1, wherein sending the plurality of attributes to the at least one processing unit comprises:
   retrieving the plurality of attributes from an external memory.

7. The method of claim 1, wherein the buffer of the at least one processing unit includes one or more buffer slots, wherein each of the one or more instance attributes are stored in one of the one or more buffer slots.

8. The method of claim 1, further comprising:
   generating the buffer of the at least one processing unit at the at least one processing unit.

9. The method of claim 1, wherein the at least one processing unit includes a vertex fetcher and decoder (VFD).

10. The method of claim 9, further comprising:
    sending at least one request from the VFD to an L2 cache (UCHE).

11. An apparatus for operation of a graphics processing unit (GPU), comprising:
    a memory; and
    at least one processor coupled to the memory and configured to:
       determine a plurality of attributes including one or more vertex attributes for a single vertex and one or more instance attributes that include data for a plurality of vertices including the single vertex;
       send the plurality of attributes to at least one processing unit, wherein the at least one processing unit is in a graphics processing pipeline of the GPU;
       separate the plurality of attributes between the one or more vertex attributes and the one or more instance attributes;
       store the one or more instance attributes a buffer of the at least one processing unit;
       store the one or more vertex attributes in a cache of the at least one processing unit that is separate from the buffer; and
       retrieve at least one of the one or more instance attributes from the buffer when the one or more instance attributes is stored in the buffer.

12. The apparatus of claim 11, wherein the at least one processor is further configured to:
    retrieve the at least some of the plurality of attributes from the cache when the at least some of the plurality of attributes are stored in the cache.

13. The apparatus of claim 12, wherein the cache of the at least one processing unit includes one or more cache slots, wherein each of the one or more vertex attributes are stored in one of the one or more cache slots.

14. The apparatus of claim 11, wherein the at least one processor is further configured to:
    determine vertex information of one or more vertices, wherein the plurality of attributes corresponds to the vertex information of the one or more vertices.

15. The apparatus of claim 14, wherein the vertex information of the one or more vertices is determined by a primitive controller (PC).

16. The apparatus of claim 11, wherein to send the plurality of attributes to the at least one processing unit comprises the at least one processor configured to:
    retrieve the plurality of attributes from an external memory.

17. The apparatus of claim 11, wherein the buffer of the at least one processing unit includes one or more buffer slots, wherein each of the one or more instance attributes are stored in one of the one or more buffer slots.

18. The apparatus of claim 11, wherein the at least one processor is further configured to:
    generate the buffer of the at least one processing unit at the at least one processing unit.

19. The apparatus of claim 11, wherein the at least one processing unit includes a vertex fetcher and decoder (VFD).

20. The apparatus of claim 19, wherein the at least one processor is further configured to:
    send at least one request from the VFD to an L2 cache (UCHE).

21. An apparatus for operation of a graphics processing unit (GPU), comprising:
- means for determining a plurality of attributes including one or more vertex attributes for a single vertex and one or more instance attributes that include data for a plurality of vertices including the single vertex;
- means for sending the plurality of attributes to at least one processing unit, wherein the at least one processing unit is in a graphics processing pipeline of the GPU;
- means separating the plurality of attributes between the one or more vertex attributes and the one or more instance attributes;
- means for storing the one or more instance attributes in a buffer of the at least one processing unit;
- means for storing the one or more vertex attributes in a cache of the at least one processing unit that is separate from the buffer; and
- means for retrieving at least one of the one or more instance attributes from the buffer when the one or more instance attributes is stored in the buffer.

22. The apparatus of claim 21, further comprising:
- means for retrieving the at least some of the plurality of attributes from the cache when the at least some of the plurality of attributes are stored in the cache.

23. The apparatus of claim 22, wherein the buffer of the at least one processing unit includes one or more buffer slots, wherein each of the one or more instance attributes are stored in one of the one or more buffer slots, wherein the cache of the at least one processing unit includes one or more cache slots, wherein each of the one or more vertex attributes are stored in one of the one or more cache slots.

24. The apparatus of claim 21, further comprising:
- means for determining vertex information of one or more vertices, wherein the plurality of attributes corresponds to the vertex information of the one or more vertices.

25. The apparatus of claim 24, wherein the vertex information of the one or more vertices is determined by a primitive controller (PC).

26. The apparatus of claim 21, wherein the means for sending the plurality of attributes to the at least one processing unit is further configured to:
- retrieve the plurality of attributes from an external memory.

27. A non-transitory computer-readable medium storing computer executable code for operation of a graphics processing unit (GPU), comprising code to:
- determine a plurality of attributes including one or more vertex attributes for a single vertex and one or more instance attributes that include data for a plurality of vertices including the single vertex;
- send the plurality of attributes to at least one processing unit, wherein the at least one processing unit is in a graphics processing pipeline of the GPU;
- separate the plurality of attributes between the one or more vertex attributes and the one or more instance attributes;
- store the one or more instance attributes in a buffer of the at least one processing unit;
- store the one or more vertex attributes in a cache of the at least one processing unit that is separate from the buffer; and
- retrieve at least one of the one or more instance attributes from the buffer when the one or more instance attributes is stored in the buffer.

* * * * *